United States Patent
Uesugi et al.

(10) Patent No.: US 8,488,227 B2
(45) Date of Patent: Jul. 16, 2013

(54) LIGHT MODULATING DEVICE

(75) Inventors: Toshitsugu Uesugi, Tokyo (JP); Hiroshi Aruga, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 67 days.

(21) Appl. No.: 13/097,275

(22) Filed: Apr. 29, 2011

(65) Prior Publication Data

US 2012/0120472 A1    May 17, 2012

(30) Foreign Application Priority Data

Nov. 16, 2010 (JP) ................... 2010-255794

(51) Int. Cl.
*G02B 26/00* (2006.01)
*G02F 1/03* (2006.01)

(52) U.S. Cl.
USPC ........................... 359/237; 359/238; 359/254

(58) Field of Classification Search
USPC .................. 359/238, 237, 245, 254
See application file for complete search history.

(56) References Cited

U.S. PATENT DOCUMENTS 6,437,899 B1    8/2002  Noda
2008/0137699 A1    6/2008  Aruga

FOREIGN PATENT DOCUMENTS

JP    2001-209017    8/2001
JP    2006-216839    8/2006

OTHER PUBLICATIONS

Gary D. Alley, "Interdigital Capacitors and Their Application to Lumped-Element Microwave Integrated Circuits", Dec. 1970, IEEE Transactions on Microwave Theory and Techniques, vol. MTT-18, No. 12, pp. 1028-1033.

*Primary Examiner* — Jack Dinh
(74) *Attorney, Agent, or Firm* — Oblon, Spivak, McClelland, Maier & Neustadt, L.L.P.

(57) ABSTRACT

To include a light modulator having an anode electrode, a matching resistor, a first wire that is connected to the anode electrode and transmits to the anode electrode an input electric signal to the light modulator, a first conductor pad having a capacitor connected to the first wire, a second wire that connects the anode electrode and the matching resistor, and a second conductor pad having a capacitor connected to the second wire.

13 Claims, 2 Drawing Sheets

LIGHT MODULATING DEVICE

BACKGROUND OF THE INVENTION

1. Field of the Invention

The present invention relates to a light modulating device that includes a light modulator and outputs a light modulation signal based on an electric modulation signal to be input.

2. Description of the Related Art

For optical communications, there has been used a light modulating device that converts an electric signal input from a terminal or the like into a light signal. The light modulating device includes a light modulator (a light modulation element) and a circuit that drives the light modulator or the like. The light modulating device has an issue of reducing reflection (electric reflection) of an electric signal to be input. For example, in a conventional light modulating device, a capacitor is added in parallel with a signal-input connection wire to a light modulator, thereby compensating for an inductance component of the wire and improving impedance matching. With this configuration, the electric reflection is reduced (see, for example, Japanese Patent Application Laid-open No. 2001-209017).

However, according to the above conventional technique, electric reflection is reduced by adding a capacitor in parallel to a conventional signal-input connection wire. Therefore, although reflection near a resonance frequency due to an inductance of the wire and the capacitor can be reduced, there is a problem that it is difficult to reduce reflection over a wideband.

SUMMARY OF THE INVENTION

It is an object of the present invention to at least partially solve the problems in the conventional technology.

A light modulating device according to an aspect of the present invention includes a light modulator having an electrode; a matching resistor, a first wire that is connected to the electrode and transmits to the electrode an input electric signal to the light modulator, a first capacitor that is connected to the first wire, a second wire that connects the electrode and the matching resistor, and a second capacitor that is connected to the second wire.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a light modulating device according to the present invention will be explained below in detail with reference to the accompanying drawings. The present invention is not limited to the embodiments.

Figure 1:
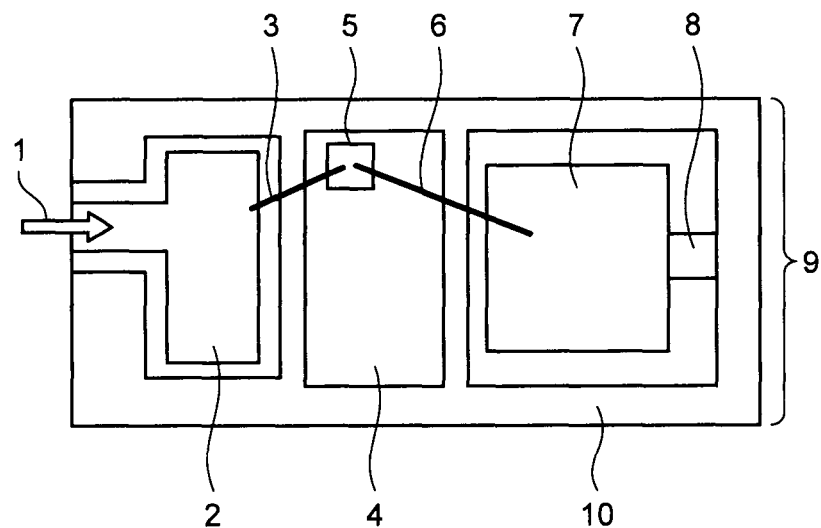
FIG. 1 is a configuration example of a light modulating device according to a first embodiment of the present invention.

FIG. 1 is a configuration example of a light modulating device according to a first embodiment of the present invention. FIG. 1 is a conceptual diagram of a planar shape of the device according to the first embodiment. As shown in FIG. 1, the light modulating device according to the first embodiment is configured by a first conductor pad 2, a first wire (an input-side wire) 3, a light modulator 4, a second wire (an output-side wire) 6, a second conductor pad 7, a matching resistor 8, a submount substrate 9, and a ground conductor 10. The light modulator 4 includes an anode electrode 5. A cathode electrode (not shown) is formed on a back surface of the light modulator 4. This cathode electrode is electrically connected to the ground conductor 10.

An input direction 1 represents a direction to which an input electric signal for modulation that is input to the light modulating device according to the first embodiment flows. The first wire 3 is made of gold and has a diameter of about 25 micrometers, for example. The first wire 3 is connected to the first conductor pad 2 and to the anode electrode 5 of the light modulator 4. In the first embodiment, the light modulator 4 is assumed to be an electro-absorption modulator.

The second wire 6 is made of gold and has a diameter of about 25 micrometers, for example, and the second wire 6 connects the second conductor pad 7 to the anode electrode 5 of the light modulator 4. The submount substrate 9 is made of aluminum nitride and has a thickness of about 0.2 millimeter, for example. The first conductor pad 2 and the second conductor pad 7 are formed on the submount substrate 9, and the light modulator 4 is mounted on the submount substrate 9. The ground conductor 10 is also formed on the submount substrate 9.

The matching resistor 8 is pattern-formed on the submount substrate 9 as a thin-film resistor, and is adjacently connected to the second conductor pad 7. With this arrangement, an inductance due to a wire connection or the like is not generated between the second conductor pad 7 and the matching resistor 8. The matching resistor 8 and the second conductor pad 7 do not need to be adjacently connected, but are preferably adjacently connected by a pattern formation to avoid generation of an inductance.

The first conductor pad 2 and the second conductor pad 7 are pattern-formed on the submount substrate 9. Although an example in which the matching resistor 8 is pattern-formed as a thin-film resistor and the first conductor pad 2 and the second conductor pad 7 are pattern-formed on the submount substrate 9 is explained here, the shapes of constituent elements and formation methods are not limited to those explained in this example.

The materials and sizes of respective constituent elements described above are only examples, and the present invention is not limited thereto. Also, the arrangement and shapes or the like of these constituent elements are not limited to those in the example shown in FIG. 1.

An operation of the first embodiment is explained next. When a modulated input electric signal is input to the light modulating device according to the first embodiment, the input electric signal is applied to the anode electrode 5 via the first conductor pad 2 and the first wire 3. In the light modulator 4, a light absorption coefficient changes according to an applied input electric signal. Therefore, modulation according to the input electric signal is performed on a light signal that is output from the light modulator 4.

Figure 2:
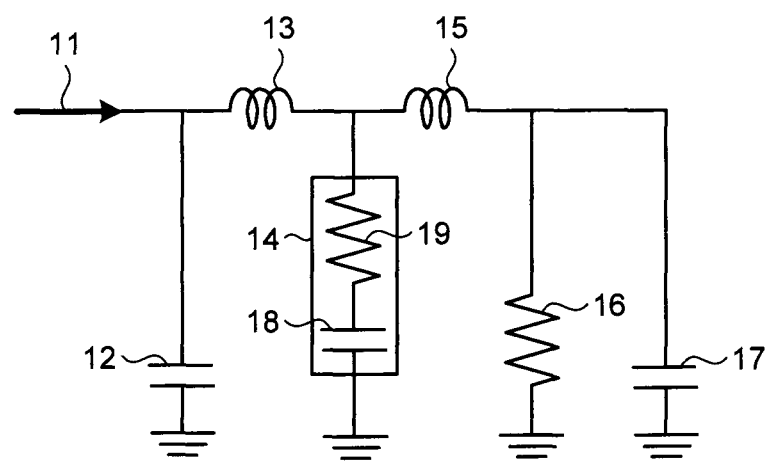
FIG. 2 is an example of an electrical equivalent circuit of the light modulating device according to the first embodiment.

FIG. 2 is an example of an electrical equivalent circuit of the light modulating device shown in FIG. 1. An input direction 11 represents a direction to which an input electric signal for modulation that is input to the light modulating device according to the first embodiment flows. A capacitor 12 has a capacitance that is equivalent to a capacitance formed by the first conductor pad 2. An inductor 13 corresponds to an inductance generated by the first wire 3.

A circuit model 14 corresponds to the light modulator 4. The circuit model 14 is configured by a capacitor 18 and a resistor 19. An inductor 15 corresponds to an inductance generated by the second wire 6. A resistor 16 has a resistance value that is similar to that of the matching resistor 8. A capacitor 17 has a capacitance that is equivalent to a capacitance formed by the second conductor pad 7.

Figure 3:
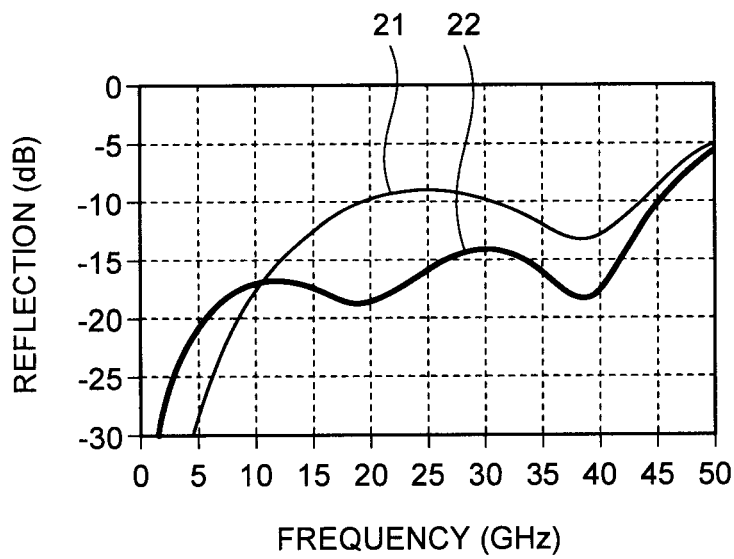
FIG. 3 is an example of a result of a simulation performed by the equivalent circuit shown in FIG. 2.

FIG. 3 is an example of a result of a simulation performed by the equivalent circuit shown in FIG. 2. In FIG. 3, based on the equivalent circuit shown in FIG. 2, the simulation result is shown when a capacitance of the capacitor 12 is 0.08 picofarad (pF), when an inductance of the inductor 13 is 0.2 nanohenry (nH), when a capacitance of the capacitor 18 is 0.18 pF, when a resistance value of the resistor 19 is 10Ω, when an inductance of the inductor 15 is 0.4 nH, when a capacitance of the capacitor 17 is 0.1 pF, and when a resistance value of the resistor 16 is 50Ω. These numerical values assumed in this simulation are an example, and characteristics of constituent elements of the light modulator 4 are not limited to these numerical values.

In FIG. 3, a lateral axis represents a frequency, and a vertical axis represents a power reflection amount of an input electric signal. A simulation result 21 represents a result when the capacitor 17 corresponding to the second conductor pad 7 is not present in a circuit configuration shown in FIG. 2. A simulation result 22 represents a result when the capacitor 17 is present (that is, based on the circuit configuration shown in FIG. 2).

As shown in FIG. 3, in the simulation result 21 when the capacitor 17 is not present, the reflection increases to −9 decibels at the maximum in a wideband from 0 to 40 gigahertz. On the other hand, in the simulation result 22 when the capacitor 17 is present, the maximum reflection amount can be reduced to or below −14 decibels.

In both the simulation results 21 and 22, there is a dip in a reflection characteristic in a frequency near 38 gigahertz. This dip is attributable to a resonance between the capacitor 12 corresponding to the first conductor pad 2 and the inductor 13 corresponding to the first wire 3. In the simulation result 22, a dip is also present in a reflection characteristic in a frequency near 20 gigahertz. This dip is attributable to a resonance between the capacitor 17 corresponding to the second conductor pad 7 and the inductor 15 corresponding to the second wire 6.

That is, in the first embodiment, low reflection can be achieved over a wideband from 0 to about 40 gigahertz by using the two resonances, and a satisfactory signal transmission can be also achieved in a high-speed digital signal transmission of a 40 Gbps (Giga bit per second) class.

Two frequencies (resonance frequencies) that generate the resonance described above respectively depend on a relationship between the inductance of the inductor 13 and the capacitance of the capacitor 12 or a relationship between the inductance of the inductor 15 and the capacitance of the capacitor 17. Therefore, to achieve a characteristic that a resonance is generated in a desired frequency, inductances of the inductor 13 and the inductor 15 (that is, the first wire 3 and the second wire 6) are estimated, and capacitances of the capacitor 12 and the capacitor 17 (that is, the first conductor pad 2 and the second conductor pad 7) are determined such that two frequencies become desired frequencies, for example.

Alternatively, inductances of the inductors 13 and 15 can be adjusted by first determining inductances of the capacitors 12 and 17. Further, a desired frequency can be obtained by adjusting both the capacitors 12 and 17 and the inductors 13 and 15. A desired capacitance is obtained by adjusting areas of the first conductor pad 2 and the second conductor pad 7, for example.

In the first embodiment, although conductor pads (the first conductor pad 2 and the second conductor pad 7) are used for the capacitors 12 and 17, parts that function as capacitors other than conductor pads can be also added as the capacitors 12 and 17.

As explained above, in the first embodiment, the light modulating device includes the capacitor 12 (the first conductor pad 2) connected in parallel to the first wire 3 that is connected to an input side of the light modulator 4, and the capacitor 17 (the second conductor pad 7) connected in parallel to the second wire 6 that is connected to a matching resistor 8 side of the light modulator 4. Therefore, reflection can be reduced over a wideband from 0 to about 40 gigahertz by using the two resonances, and a satisfactory signal transmission can be also achieved in a high-speed digital signal transmission of a 40 Gbps class.

A configuration example of a light modulating device according to a second embodiment of the present invention is explained next. Although the capacitors 12 and 17 are formed by the first conductor pad 2 and the second conductor pad 7, respectively in the first embodiment, capacitors of an interdigital capacitor structure (comb-shaped conductor pattern) is used for the capacitors 12 and 17 according to the second embodiment.

For example, the interdigital capacitor structure (comb-shaped conductor pattern) is described on page 1029 and in FIG. 1 of "Interdigital Capacitors and Their Application to Lumped-Element Microwave Integrated Circuits", included in the Issue 12, Volume 18 of "IEEE Transactions on Microwave Theory and Techniques". When achieving a desired capacitance by forming a capacitor by this comb-shaped conductor pattern, the capacitance can be achieved in a smaller area than that when the capacitance is achieved by increasing an area of a conductor pad. Configurations and operations of the second embodiment other than those described above are identical to those of the first embodiment.

As described above, in the second embodiment, the capacitors 12 and 17 are formed in a comb-shaped conductor pattern. Therefore, effects identical to those of the first embodiment can be achieved, and areas of constituent elements corresponding to the capacitors 12 and 17 can be made smaller than those in the first embodiment.

Figure 4:
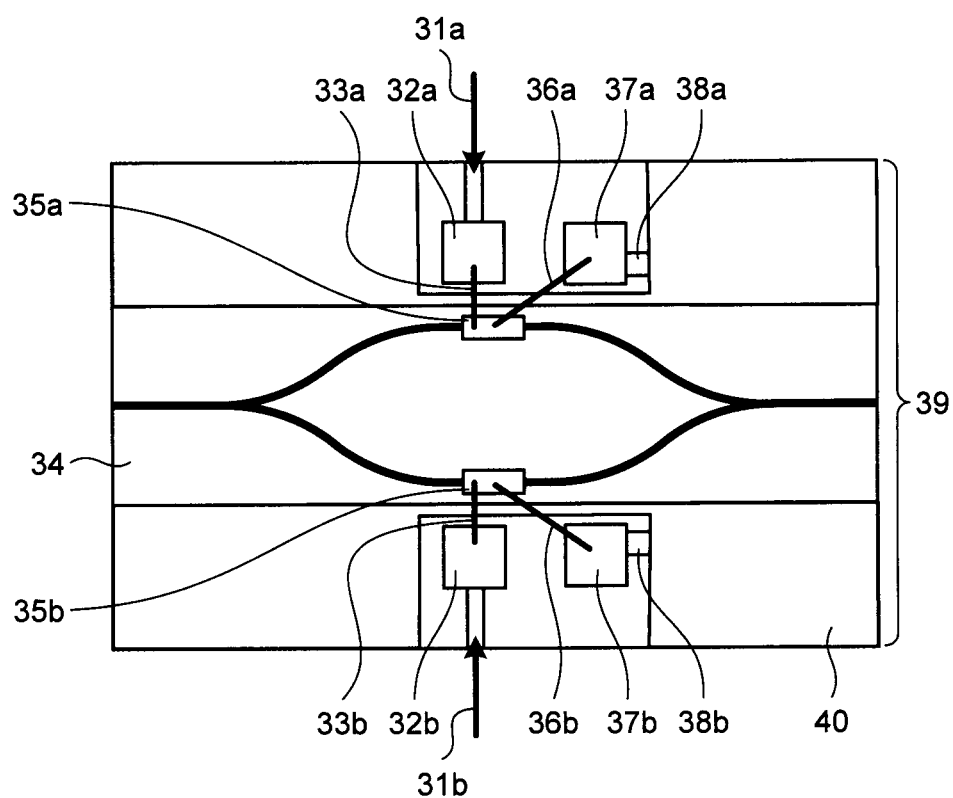
FIG. 4 is a configuration example of a light modulating device according to a third embodiment of the present invention.

FIG. 4 is a configuration example of a light modulating device according to a third embodiment of the present invention. FIG. 4 is a conceptual diagram of a planar shape of the device according to the third embodiment. As shown in FIG. 4, the light modulating device according to the third embodiment is configured by first conductor pads 32a and 32b, first wires 33a and 33b, a light modulator 34, second wires 36a and 36b, second conductor pads 37a and 37b, matching resistors 38a and 38b, a submount substrate 39, and a ground conductor 40. The light modulator 34 includes an anode electrode 35 at a positive phase side, and an anode electrode 35b at a reverse phase side.

Although the light modulating device according to the first embodiment uses an electro-absorption modulator for the modulator 4, the light modulating device according to the third embodiment uses a Mach-Zehnder light modulator that uses quenching by coherence of light, and the light modulating device functions as a voltage drive circuit for refractive-index modulation of the light modulator 34.

As shown in FIG. 4, the light modulating device according to the third embodiment uses a differential signal for an input electric signal. An input direction 31a represents a direction of a flow of an input electric signal in the positive phase, and an input direction 31b represents a direction of a flow of an input electric signal in the reverse phase.

The first conductor pad 32a, the first wire 33a, the second wire 36a, the second conductor pad 37a, and the matching resistor 38a are set at a side (the positive phase side) to which the input electric signal in the positive phase is input. The first conductor pad 32b, the first wire 33b, the second wire 36b, the second conductor pad 37b, and the matching resistor 38b are set at a side (the reverse phase side) to which the input electric signal in the reverse phase is input.

The first wire 33a is made of gold and has a diameter of about 25 micrometers, for example. The first wire 33a is connected to the first conductor pad 32a and to the anode electrode 35a at the positive phase side. The light modulator 34 is a Mach-Zehnder light modulator (made of lithium niobate, a semiconductor or the like). The second wire 36a is made of gold and has a diameter of about 25 micrometers, for example. The second wire 36a is connected to the second conductor pad 37a and to the anode electrode 35a.

Similarly, the first wire 33b is made of gold and has a diameter of about 25 micrometers, for example. The first wire 33b is connected to the first conductor pad 32b and to the anode electrode 35b at the reverse phase side. The second wire 36b is made of gold and has a diameter of about 25 micrometers, for example. The second wire 36b is connected to the second conductor pad 37b and to the anode electrode 35b.

The submount substrate 39 is made of aluminum nitride and has a thickness of about 0.2 millimeter, for example. The first conductor pad 32a, the second conductor pad 37a, and the matching resistor 38a at the positive phase side are formed on the submount substrate 39, and the first conductor pad 32b, the second conductor pad 37b, and the matching resistor 38b at the reverse phase side are also formed on the submount substrate 39. The light modulator 34 is mounted on the submount substrate 39. The ground conductor 40 is for the submount substrate 39.

The matching resistor 38a at the positive phase side and the matching resistor 38b at the reverse phase side are formed as thin-film resistors on the submount substrate 39. The matching resistors 38a and 38b are adjacently connected to the second conductor pad 37a at the positive phase side and to the second conductor pad 37b at the reverse phase side, respectively. With this arrangement, an inductance due to a wire connection or the like is not generated between the second conductor pad 37a and the matching resistor 38a at the positive phase side and between the second conductor pad 37b and the matching resistor 38b at the reverse phase side.

A cathode electrode (not shown) is formed on a back surface of the light modulator 34. The cathode electrode is electrically connected to the ground conductor 40. In a configuration example shown in FIG. 4, definitions of the positive phase and the reverse phase can be replaced with each other.

In the third embodiment, both the positive phase side and the reverse phase side include two conductor pads (capacitors), respectively in a similar manner to that in the first embodiment, thereby generating two resonances. With this arrangement, electric reflection is reduced in a similar manner to that in the first embodiment.

In the third embodiment, although an input electric signal is differentiated to perform a differential drive, in a case of a single-phase drive using only a single phase, effects identical to those in the first embodiment can be also achieved by similarly including two conductor pads (capacitors). In this manner, the configuration can be selected by corresponding to the specification of a light modulator to be used.

In the third embodiment, although a Mach-Zehnder light modulator is used for the light modulator 34, the present invention is not limited thereto, and other types of light modulators can be also used. In a case of driving the modulator by a differential signal using a different type of modulator, it suffices that both the positive phase side and the reverse phase side include two conductor pads (capacitors), respectively, in a similar manner to that in the first embodiment.

In the third embodiment, although an example of using a conductor pad for a capacitor in a similar manner to that in the first embodiment has been explained, a capacitor that is formed in a comb-shaped conductor pattern can be also used in a similar manner to that in the second embodiment.

As explained above, in the third embodiment, in the case of differentiating an input electric signal, both the positive phase side and the reverse phase side include two conductor pads (capacitors), respectively in a similar manner to that in the first embodiment. Therefore, when an input electric signal is differentiated, effects identical to those in the first embodiment can be also achieved in the third embodiment.

According to the present invention, reflection of an input electric signal can be reduced over a wideband.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A light modulating device comprising:
a light modulator having an electrode;
a matching resistor;
a first wire that is connected to the electrode and transmits to the electrode an input electric signal to the light modulator;
a first capacitor that is connected to the first wire;
a second wire that connects the electrode to the matching resistor; and
a second capacitor that is directly connected to the second wire and directly connected to the matching resistor.

2. The light modulating device according to claim 1, wherein the first capacitor and the second capacitor are conductor pads.

3. The light modulating device according to claim 2, further comprising a submount substrate on which the light modulator is mounted, wherein
the conductor pads are pattern-formed on the submount substrate.

4. The light modulating device according to claim 1, further comprising a submount substrate on which the light modulator is mounted, wherein
the first capacitor and the second capacitor are formed in a comb-shaped conductor pattern on the submount substrate.

5. The light modulating device according to claim 4, wherein the matching resistor is a thin-film resistor that is pattern-formed on the submount substrate.

6. The light modulating device according to claim 5, wherein the matching resistor and the capacitors are pattern-formed to be adjacently connected to each other on the submount substrate.

7. The light modulating device according to claim 1, wherein a capacitance of the first capacitor is determined such that a resonance is generated within a band of the light modulator by the first wire and the first capacitor, and a capacitance of the second capacitor is determined such that a resonance is generated within a band of the light modulator by the second wire and the second capacitor.

8. The light modulating device according to claim 7, wherein a resonance frequency of a resonance generated by the first wire and the first capacitor and a resonance frequency of a resonance generated by the second wire and the second capacitor are different from each other.

9. The light modulating device according to claim 1, wherein the light modulator is an electro-absorption modulator.

10. The light modulating device according to claim 1, wherein the light modulator is a Mach-Zehnder light modulator.

11. The light modulating device according to claim 1, wherein
the input electric signal is a differential signal, and
the light modulating device comprises the first wire, the first capacitor, the second wire, the matching resistor, and the second capacitor for each of the input electric signal in a positive phase and in a reverse phase.

12. The light modulating device according to claim 1, wherein
the second capacitor is connected in parallel with the matching resistor, and
a parallel circuit of the second capacitor and the matching resistor is connected in series with the second wire.

13. The light modulating device according to claim 1, wherein the second capacitor is different from the first capacitor and the light modulator.

* * * * *